United States Patent
Ibert et al.

(10) Patent No.: US 8,871,895 B2
(45) Date of Patent: Oct. 28, 2014

(54) PROCESS FOR MANUFACTURING POLYCARBONATE FROM DERIVATIVES OF DIANHYDROHEXITOLS BEARING TWO ALKYL CARBONATE FUNCTIONS

(75) Inventors: Mathias Ibert, La Chapelle d'armentieres (FR); Emilie Josien, St Venant (FR); Herve Wyart, Cuinchy (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 14/110,278

(22) PCT Filed: Apr. 5, 2012

(86) PCT No.: PCT/FR2012/050749
§ 371 (c)(1),
(2), (4) Date: Oct. 7, 2013

(87) PCT Pub. No.: WO2012/140353
PCT Pub. Date: Oct. 18, 2012

(65) Prior Publication Data
US 2014/0031516 A1    Jan. 30, 2014

(30) Foreign Application Priority Data

Apr. 5, 2011  (FR) ...................... 11 52951

(51) Int. Cl.
| | |
|---|---|
| *C08G 64/00* | (2006.01) |
| *C08G 64/16* | (2006.01) |
| *C08G 64/02* | (2006.01) |
| *C08G 64/30* | (2006.01) |
| *C08G 75/00* | (2006.01) |

(52) U.S. Cl.
CPC .......... *C08G 64/305* (2013.01); *C08G 64/1608* (2013.01); *C08G 64/0208* (2013.01)
USPC ......................................... 528/371; 528/372

(58) Field of Classification Search
USPC .................................................. 528/371, 372
See application file for complete search history.

(56) References Cited

U.S. PATENT DOCUMENTS

| | | | |
|---|---|---|---|
| 2004/0241553 A1 | 12/2004 | Abe et al. | |
| 2012/0041169 A1 | 2/2012 | Fuertes et al. | |

FOREIGN PATENT DOCUMENTS

| | | |
|---|---|---|
| EP | 2 033 981 A1 | 3/2009 |
| JP | 6261774 A | 9/1994 |
| JP | 2003292603 A | 10/2003 |
| WO | 2011/039483 A1 | 4/2011 |

OTHER PUBLICATIONS

Database CA [Online] Chemical Abstracts Service, Columbus, Ohio, US; Kawakami, Satoshi et al.: "Thermoplastic molding material containing polycarbonate involving saccharide residue", XP002660905, retrieved from STN Database accession No. 139:308542 abstract & JP 2003 292603 A (Matsushita Electric Industrial Co., Ltd., Japan) Oct. 15, 2003.
Saber Chatti et al.: "Cyclic and Noncyclic Polycarbonates of Isosorbide (1,4:3,6-Dianhydro-D-glucitol)", Macromolecules, vol. 39, No. 26, Dec. 1, 2006, pp. 9064-9070, XP055009118, ISSN: 0024-9297, DOI: 10.1021/ma0606051 Schema 1;tables 2-4; compounds Lb, Lc.
International Search Report, dated Jun. 6, 2012, from corresponding PCT application.

*Primary Examiner* — Terressa Boykin
(74) *Attorney, Agent, or Firm* — Young & Thompson

(57) ABSTRACT

A process for manufacturing polycarbonate includes:—a step (1) of introducing into a reactor a particular composition (A) of at least one dianhydrohexitol carbonate bearing two alkyl carbonate functions; a step (2) of introducing a diol or a mixture of diols (B); a subsequent step (3) of polycondensation by transesterification of the mixture of monomers including (A) and (B); a step (4) of recovering the polycarbonate formed during step (3).

15 Claims, No Drawings

PROCESS FOR MANUFACTURING POLYCARBONATE FROM DERIVATIVES OF DIANHYDROHEXITOLS BEARING TWO ALKYL CARBONATE FUNCTIONS

FIELD OF THE INVENTION

The invention relates to a novel process for manufacturing polycarbonate having the advantages which will be described below, and to the polycarbonate that may be obtained via this process.

TECHNICAL PROBLEM

The development of polymers derived from short-term renewable biological resources has become an ecological and economical imperative, in the face of the depletion and the rise in prices of fossil resources such as petroleum.

In this context, the use of dianhydrohexitols, derived from plant (poly)saccharides, as dihydroxylated monomers for the manufacture of polymers by polycondensation, appears to be a promising approach for replacing monomers of petrochemical origin.

Among these polymers, polycarbonates are amorphous thermoplastic materials that have advantageous properties, in particular advantageous mechanical or optical properties. Conventionally, they are obtained by polycondensation of diols and of diphenyl carbonate, phosgene or diphosgene.

By way of example, the preparation of polycarbonates based on dianhydrohexitols was described in patent application EP 2 033 981 A1. Said document describes the polycondensation of a mixture of isosorbide, of at least a second alicyclic diol and of diphenyl carbonate.

The process has the drawback of generating phenol, which is a toxic compound, in large amounts as a byproduct of the polymerization reaction.

Another example of a process for manufacturing isosorbide-based polycarbonate is also described in the article by Saber Chatti, entitled "Cyclic and Noncyclic Polycarbonates of Isosorbide (1,4:3,6-dianhydro-D-glucitol)", in Macromolecules, 2006, 9061-9070. The only processes that effectively enable the manufacture of polycarbonate themselves use reagents or solvents that are toxic, or even very toxic, such as phosgene, diphosgene, pyridine or bis-chloroformate.

Mention may also be made of patent application US 2004/0241553 A1 which describes an ion-conducting electrolyte, based on a compound comprising dianhydrohexitol carbonate groups and an electrolyte salt. The electrolyte compound based on dianhydrohexitol carbonate may optionally be a polymer.

An intermediate for the manufacture of this electrolyte compound, described in formula (6) of said document, is chosen from certain dianhydrohexitol dialkyl carbonates and dianhydrohexitol diphenyl carbonate. However, according to the variant in which this compound is a polymer, it is always manufactured from dianhydrohexitol diphenyl carbonate.

The process for manufacturing this polymer compound also generates phenol.

The polymer is obtained by copolymerization with a monomer chosen from aliphatic diols and oligomeric ethers. This results in a flexible polymer, this flexibility being a necessary condition for obtaining good ion conductivity of the electrolyte.

There thus remains at the present time a need to find novel routes for manufacturing polycarbonates.

In particular, it is advantageous to find processes for generating compounds that are less toxic than those usually generated during standard synthetic processes.

It is also advantageous for this process to use sparingly toxic reagents.

In the course of its research, the Applicant has succeeded in developing a novel process for obtaining polycarbonate comprising units derived from particular dianhydrohexitol derivatives, which satisfies at least one of the problems outlined above.

Specifically, by using the process according to the invention, it is possible to not generate phenol during the manufacturing process, but less toxic alcohols. Furthermore, the process also dispenses with the use of toxic reagents such as phosgene and derivatives thereof.

SUMMARY OF THE INVENTION

The present invention more particularly relates to a process for manufacturing a polycarbonate, characterized in that it comprises:

a step (1) of introducing, into a reactor, a composition (A) comprising at least one dianhydrohexitol carbonate bearing two alkyl carbonate functions, said composition (A) comprising, relative to the sum of (A1) plus (A2):

from 0 to 99.9% by weight and preferentially from 70% to 99.9% by weight of monomers (A1) of formula:

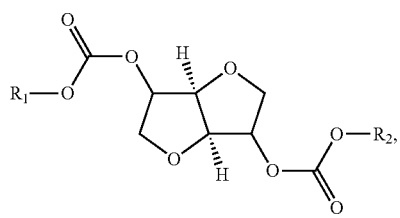

and from 0.1% to 100% by weight and preferentially from 0.1% to 30% by weight of monomers (A2) of formula:

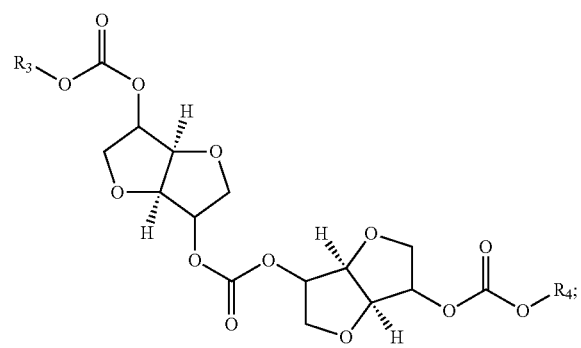

and R1, R2, R3 and R4 being identical or different alkyl groups;

a step (2) of introducing a diol or a mixture of diols (B);

a subsequent step (3) of polycondensation by transesterification of the monomer mixture comprising (A2), (B) and optionally (A1);

a step (4) of recovering the polycarbonate formed in step (3).

The Applicant has also found that this particular process allows the manufacture of a polycarbonate with a higher glass transition temperature ($T_v$) than that of a polycarbonate manufactured under the same conditions but in the absence of (A2), i.e. with a composition (A) consisting solely of monomer (A1).

The process according to the invention allows the manufacture of polycarbonates that are useful in any type of application, including the most demanding applications, for instance the manufacture of parts that require high rigidity.

It is stated that, according to the variant in which the monomer mixture used in the step of polycondensation by transesterification comprises (A1), this clearly means that the weight amount of (A2) in composition (A) is less than 100%, for example ranging from 0.1% to 99.9%.

The Applicant has found that the glass transition temperature is particularly high when composition (A) comprises, relative to the total weight of monomers (A1) and (A2), from 70% to 99.9% of (A1) and from 0.1% to 30% of (A2).

The alkyl groups R1, R2, R3 and R4 borne by the monomers (A) may comprise from 1 to 10 carbon atoms, advantageously from 1 to 6 and preferably from 1 to 4, and are most particularly chosen from methyl and ethyl groups.

Preferentially, the dianhydrohexitol carbonates of composition (A) are isosorbide derivatives.

Advantageously, composition (A) introduced during step (1) comprises, relative to the total weight of monomers (A1) and (A2):
from 75% to 99%, advantageously from 80% to 97%, for example from 85% to 95%, of (A1); and
from 1% to 25%, advantageously from 3% to 20%, for example from 5% to 15%, of (A2),
since it makes it possible to obtain a polycarbonate having a particularly high glass transition temperature.

Monomer (B) advantageously consists of a mixture of diols comprising at least 1 mol % of one or more cyclic diols, for example at least 20%, or even at least 50%, preferentially at least 80%. (B) most preferably consists of one or more cyclic diols.

The use of this preferred diol or mixture of diols also makes it possible to obtain a polycarbonate with a higher glass transition temperature.

The cyclic diol which may be included in (B) is preferentially nonaromatic.

Advantageously, the cyclic diol of (B) comprises 5- or 6-membered rings. It is preferentially chosen from isosorbide, isomannide, isoidide, 1,2-cyclohexanedimethanol, 1,3-cyclohexanedimethanol and 1,4-cyclohexanedimethanol.

According to the process of the invention, the mole ratio (A)/(B) advantageously ranges from 0.7 to 1.3, preferentially from 0.8 to 1.25, for example from 0.9 to 1.1.

According to an advantageous mode of the process of the invention, the sum of (A1), (A2) and (B) constitutes more than 60 mol % of the total amount of monomers introduced into the reactor, for example more than 90 mol %. Composition (A) preferentially comprises more than 75 mol % and preferably more than 90 mol % of monomers (A1) and (A2).

The reactor may be adjusted to a temperature ranging from 100° C. to 250° C. during step (3), preferentially from 150 to 235° C.

As outlined above, the invention relates to a process using a particular mixture of monomers (A1), (A2) and (B). The type and conditions of polycondensation by transesterification are not particularly limited.

However, step (3) advantageously takes place in the presence of a known catalyst for polycondensation by transesterification, advantageously a catalyst comprising at least one alkali metal or alkaline-earth metal ion, a quaternary ammonium ion, a quaternary phosphonium ion, a cyclic nitrogen compound, a basic boron-based compound or a basic phosphorus-based compound.

The catalyst may be most specially chosen from cesium carbonate, triazoles, tetramethylammonium hydroxide, most preferentially cesium carbonate. The polycondensation catalyst optionally present during step (3) may be present in molar amounts ranging from $10^{-7}$ mol % to 1 mol %, preferentially from $10^{-4}$ mol % to 0.5 mol %, relative to the sum of monomers (A1) and (A2).

Advantageously, step (3) of the process according to the invention is performed under an inert atmosphere, for example under nitrogen.

According to an advantageous embodiment of the process, at least part of step (3) is performed at a pressure ranging from 30 kPa to 110 kPa, advantageously from 50 to 105 kPa and preferentially from 90 to 105 kPa, for example at atmospheric pressure.

Specifically, according to the standard processes, the polycondensation reaction by transesterification must be performed under a relatively high vacuum (generally at a maximum pressure of 20 kPa) in order to be able to perform it satisfactorily. The process of the invention has the advantage of working under a relatively light vacuum.

According to the process of the invention, the polycarbonate recovered in step (4) advantageously has a weight-average molar mass of greater than or equal to 5000 g/mol, preferentially ranging from 8000 to 200 000 g/mol.

It may also have a glass transition temperature of greater than or equal to 25° C., for example greater than or equal to 50° C. and advantageously from 100 to 180° C., for example from 120 to 170° C. As explained below in the detailed description, the glass transition temperature may be adjusted by a person skilled in the art, especially by appropriately selecting the monomers (A1), (A2) and (B).

Obtaining a glass transition temperature of greater than or equal to 20° C., or more, makes it possible to obtain a polycarbonate that is rigid at room temperature. A rigid material may have a Young's modulus at 25° C. ranging from 200 to 5000 MPa, for example from 1000 to 4000 MPa.

The process according to the invention makes it possible to manufacture a novel polycarbonate, which may have the properties already outlined.

In particular, the novel polycarbonate that may be obtained via a process according to the present invention has the following structural characteristics:
it contains at least one alkyl carbonate end function,
and it comprises at least two successive units:

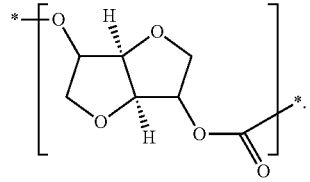

Another subject of the invention relates to the use of a composition (A) as described above for the manufacture of polycarbonate.

The invention will be described in greater detail hereinbelow.

DETAILED DESCRIPTION OF THE INVENTION

According to the present invention, the term "polycarbonate" means any polymer comprising repeating units, formed by the reaction of monomers, linked via carbonate bonds, and in particular the repeating units described above. These repeating units are formed by reaction of the monomers (A1), (A2) and (B). The polycarbonate may contain only repeating units linked via carbonate bonds (polycarbonate homopolymer); it may also be a copolymer containing repeating units linked via carbonate bonds and repeating units linked via other bonds such as carboxylic acid ester or urethane bonds.

In the present patent application, the term "monomer" means a compound containing at least two functions that are capable of reacting with an alcohol function or an alkyl carbonate function in a transesterification reaction.

As explained previously, the invention relates to a process for manufacturing polycarbonate by reacting the monomers (A2), (B) and optionally (A1) presented above. Monomer (A1) may be chosen from the group formed by isosorbide dialkyl carbonate, isomannide dialkyl carbonate and isoidide dialkyl carbonate.

Monomer (A2) may be described as a dimer of monomer (A1). Depending on the dianhydrohexitol used, one or more conformations of dimers (A2) may be obtained.

R1, R2, R3 and R4 borne by (A1) and (A2) are alkyl groups, which may be linear or branched.

Monomer (B) is a diol or a mixture of diols.

When they are combined with the term "monomer" or "dimer", the numbers "one", "two" or "more" mean in the present patent application the number of monomers of different types. By way of example, when a monomer is introduced into the reactor or reacts, this obviously does not mean that only one molecule is introduced or reacts, but that several molecules of the same type are introduced or react.

Composition (A) containing the monomers (A2) and optionally (A1) is placed in the reactor during the introduction step (1). According to a first variant, composition (A) comprises the mixture of two monomers (A1) and (A2) already described. According to a second variant, composition (A) comprises monomer (A2) and is free of monomer (A1).

Monomer (A1) may be obtained by using, for example, the processes already known for the manufacture of dianhydrohexitol dialkyl carbonate.

It is possible, for example, to manufacture monomer (A1) by reacting dianhydrohexitol and an alkyl chloroformate, these reagents being introduced into a reactor in mole proportions of 1:2. This type of process is described, for example, in document JP 6-261774 in example 5 thereof. According to this process, only dianhydrohexitol dialkyl carbonate is formed, and no dimer (A2) is manufactured. Monomer (A2) may be manufactured by reacting, for example, in a first step, one mole of dianhydrohexitol with one mole of an alkyl chloroformate so as to form the dianhydrohexitol monoalkyl carbonate, and then, in a second step, one mole of phosgene with two moles of the dianhydrohexitol monoalkyl carbonate formed in the first step.

These two monomers (A1) and (A2) may thus be mixed to form composition (A) either before their introduction into the reactor, or within the reactor itself.

An advantageous possibility for manufacturing composition (A) is to use a process for the simultaneous synthesis of (A1) and (A2). Specifically, the Applicant has also developed a process for manufacturing such a mixture. This process is described in detail in international patent application PCT/FR2010/052 066.

This preparation process comprises, in the following order, the following steps:
(a) preparation of an initial reaction mixture containing
at least one dianhydrohexitol,
at least 2 molar equivalents, relative to the amount of dianhydrohexitol present, of at least one dialkyl carbonate, and
a transesterification catalyst, for instance potassium carbonate,
(b) heating the reaction mixture to a temperature greater than or equal to the boiling point of the alcohol R—OH formed by the transesterification reaction, or greater than or equal to the boiling point of the azeotropic mixture formed by the alcohol R—OH obtained with another of the components present in the reaction mixture, and at most equal to the boiling point of the reaction mixture, in a reactor equipped with a rectification column comprising a number of theoretical distillation plates that is sufficient to separate from the reaction mixture the alcohol obtained, or the azeotrope which it forms with another of the components present in the reaction mixture.

The solution obtained at the end of the process comprises a mixture of monomers (A1) and (A2) with dialkyl carbonate. A distillation is performed and the mixture of (A1) and (A2) free of dialkyl carbonate is recovered.

The ratio (A1)/(A2) may be varied by modifying the initial reaction mixture: said mixture advantageously contains from 2.1 to 100 molar equivalents, preferably from 5 to 60 molar equivalents and in particular from 10 to 40 molar equivalents of dialkyl carbonate, relative to the amount of dianhydrohexitol initially present in the reaction medium. The larger the amount of dialkyl carbonate, the higher the ratio (A1)/(A2) in the solution of monomers obtained.

For example, the Applicant has found that by reacting isosorbide and dimethyl carbonate in the presence of potassium carbonate under the conditions of the process described above, a solution of monomers comprising (A1) and (A2) could be obtained with a ratio (A1)/(A2) ranging from about 4 (when the dialkyl carbonate/isosorbide ratio is 10) to about 20 (when the dialkyl carbonate/isosorbide ratio is 40).

Furthermore, this process for the simultaneous synthesis of (A1) and (A2) has the advantages of using reagents that are less toxic than the alkyl chloroformate used in the process described in document JP 6-261774, for example; the synthetic coproducts are also less toxic than the chlorinated species emitted during the synthesis with chloroformate (methanol in the case where the alkyl is a methyl, ethanol in the case where the alkyl is an ethyl).

Composition (A) may comprise monomers bearing two alkyl carbonate functions other than (A1) and (A2). More particularly, it may comprise oligomers of (A1) with a degree of polymerization of greater than or equal to 3.

However, composition (A) advantageously comprises more than 75 mol %, preferably more than 90 mol % and even more preferentially more than 98 mol % of monomers (A1) and (A2).

The amount of each of the constituents of composition (A) may be determined via chromatographic methods, for instance gas chromatography (GC).

The amounts of each of the constituents may be measured by GC via analysis in the form of trimethylsilyl derivatives.

The sample may be prepared according to the following method: 500 mg of sample and 50 mg of glucose pentaacetate (internal standard) of known purity are weighed out in a beaker. 50 ml of pyridine are added and the mixture is stirred until dissolution is complete. 1 ml is taken up in a crucible, 0.5 ml of bis(trimethylsilyl)trifluoroacetamide is added and the mixture is then heated at 70° C. for 40 minutes.

To produce the chromatogram, a VARIAN 3800 chromatograph may be used, equipped with:
- a DB1 column 30 m long and 0.32 mm in diameter with a film thickness of 0.25 pm,
- an injector of 1177 type equipped with a focus liner with glass wool and heated to 300° C. using a split ratio of 30, the helium flow rate being 1.7 ml/min,
- an FID detector heated to a temperature of 300° C. set with a sensitivity of $10^{-11}$.

1.2 μl of the sample may be introduced, in split mode, into the chromatograph, the column being heated from 100° C. to 320° C. with a ramp of 7° C./min and then a stage of 15 min at 320° C. Under these analysis conditions, when A1 is an isosorbide dimethyl carbonate and A2 dimers of A1, A1 has a relative retention time of about 0.74, A2 has a relative retention time ranging from about 1.34 to 1.79, the internal standard having a retention time of about 15.5 minutes.

With the aid of the chromatogram, the mass percentage of each of the constituents may be calculated by determining the area of the corresponding peaks and by calculating, for each constituent, the ratio of the area of the peak corresponding thereto to all of the peaks (with the exception of the peak for the internal standard).

The addition of composition (A) also includes the separate addition of its constituents, whether simultaneously or successively.

A synthetic method enabling the direct synthesis of a mixture of (A1) and (A2) may also be used, for example as according to the advantageous process that has just been described.

Monomer (B) is, itself, a diol or a mixture of diols.

The diol may be cyclic or noncyclic.

Noncyclic diols that may be mentioned include linear or branched alkyl diols. This noncyclic diol may comprise from 2 to 10 carbon atoms, for instance ethylene glycol, 1,3-propanediol, 1,4-butanediol, 1,5-pentanediol, 1,6-hexanediol, 1,7-heptanediol, 1,8-octanediol, 1,9-nonanediol or 1,10-decanediol.

The cyclic diol may comprise one or more rings, for example from 2 to 4 rings, preferentially 2 rings. Each ring preferentially comprises from 4 to 10 atoms. The atoms included in the rings may be chosen from carbon, oxygen, nitrogen and sulfur. Preferentially, the constituent atoms of the ring are carbon or carbon and oxygen.

The cyclic diol may be aromatic or nonaromatic.

The aromatic diols preferentially comprise from 6 to 24 carbon atoms. Examples of aromatic diols that may be mentioned include the group of bisphenols such as 2,2-bis(4-hydroxyphenyl)propane (bisphenol A), 2,2-bis(3,5-dimethyl-4-hydroxyphenyl)propane, bis(4-hydroxyphenyl)methane (bisphenol F), 1,1-bis(4-hydroxyphenyl)cyclohexane (bisphenol C) and 1,1-bis(4-hydroxyphenyl)ethane (bisphenol AD).

The nonaromatic cyclic diol may comprise from 4 to 24 carbon atoms and advantageously from 6 to 20 carbon atoms. Advantageously, this nonaromatic cyclic diol is a dianhydrohexitol such as isosorbide, isomannide or isoidide, cyclohexanedimethanols such as 1,2-cyclohexanedimethanol, 1,3-cyclohexanedimethanol and 1,4-cyclohexanedimethanol, tricyclodecanedimethanols, pentacyclopentanedimethanols, decalindimethanols such as 2,6-decalindimethanol, 1,5-decalindimethanol and 2,3-decalindimethanol, norbornanedimethanols such as 2,3-norbornanedimethanol and 2,5-norbornanedimethanol, adamantanedimethanols such as 1,3-adamantanedimethanol, cyclohexanediols such as 1,2-cyclohexanediol, 1,3-cyclohexanediol and 1,4-cyclohexanediol, tricyclodecanediols, pentacyclopentadecanediols, decalindiols, norbornanediols or adamantanediols.

Preferably, the cyclic diol is chosen from isosorbide, isomannide and isoidide, 1,2-cyclohexanedimethanol, 1,3-cyclohexanedimethanol and 1,4-cyclohexanedimethanol.

The mole ratio (A1)+(A2)/(B) advantageously ranges from 0.7 to 1.3, preferentially from 0.8 to 1.25, preferentially from 0.9 to 1.1 and most preferentially from 0.95 to 1.05.

It is possible to introduce, according to the process of the invention, monomers other than (A1), (A2) and (B). Monomers comprising more than 2 alcohol or carbonate functions may be introduced, for example. Monomers comprising several functions chosen from the carboxylic acid, carboxylic acid ester or amine function, or mixtures of these functions, may also be introduced.

In particular, it is also possible to introduce, simultaneously with the monomers bearing two alkyl carbonate functions, other products. These may be coproducts of the synthesis of monomers (A1) and (A2). These products may be dianhydrohexitol monoalkyl carbonate, dianhydrohexitol dialkyl ether, dianhydrohexitol monoalkyl ether or dianhydrohexitol monoalkyl carbonate monoalkyl ether.

It is also possible to introduce chain-termination agents, which are compounds comprising only one function capable of reacting with an alcohol or carbonate function.

However, of all of the monomers introduced into the reactor, it is preferable for the sum of (A1), (A2) and (B) to constitute more than 90 mol % of the total amount of monomers introduced, advantageously more than 95 mol % or even more than 99 mol %. Most preferentially, the monomers introduced into the reactor consist essentially of the monomers (A1), (A2) and (B). Obviously, it is preferred to limit the amount of diaryl carbonate and of halogenated monomers introduced, for example to amounts of less than 5% of the total number of moles of monomers introduced. In a preferred embodiment, no diaryl carbonate or halogenated monomer is introduced into the polycondensation reactor.

The order of the introduction steps (1) and (2) is not a determining factor for the present invention. Step (1) may be performed before step (2) or vice versa. These two steps may also be performed simultaneously. According to one variant, a premix of monomers (A1), (A2) and (B) is prepared before introducing them into the reactor.

To enable the formation of the polycarbonate according to the process of the invention, monomer (A) reacts with monomer (B) via a transesterification reaction, this reaction being performed in a reactor. This reaction may take place in the absence of catalyst. The presence of a catalyst makes it possible to accelerate the reaction and/or to increase the degree of polymerization of the polycarbonate thus formed during step (3).

As regards the transesterification catalyst optionally used in step (3), it may be a catalyst comprising at least one alkali metal or alkaline-earth metal ion, a quaternary ammonium ion, a quaternary phosphonium ion, a cyclic nitrogen compound, a basic boron-based compound or a basic phosphorus-based compound.

As examples of catalysts comprising at least one alkali metal ion, mention may be made of cesium, lithium, potassium or sodium salts. These salts may in particular be carbonates, hydroxides, acetates, stearates, borohydrides, borides, phosphates, alkoxides or phenoxides, and also derivatives thereof.

As catalyst comprising at least one alkaline-earth metal ion, mention may be made of calcium, barium, magnesium or strontium salts. These salts may in particular be carbonates, hydroxides, acetates or stearates, and also derivatives thereof.

As regards the basic boron-based compounds, they are preferentially salts of alkyl or phenyl boron derivatives such as tetraphenylboron.

The catalysts comprising basic phosphorus-based compounds may be phosphines.

The catalysts comprising a quaternary ammonium ion are preferentially hydroxides such as tetramethylammonium hydroxide.

The catalysts comprising a cyclic nitrogen compound are preferentially triazole, tetrazole, pyrrole, pyrimidine, pyrazine, pyridazine, picoline, piperidine, pyridine, aminoquinoline or imidazole derivatives.

The amount of the catalyst advantageously ranges from $10^{-7}$% to 1 mol %, preferentially from $10^{-4}$% to 0.5 mol % relative to the amount of monomers (A1) and (A2). This amount may be adjusted as a function of the catalyst used. For example, from $10^{-3}$ to $10^{-1}$ mol % of catalyst comprising at least one alkali metal ion is preferentially used.

Additives such as stabilizers may optionally be added to composition (A) and/or to the diol (B).

The stabilizer may be, for example, a compound based on phosphoric acid such as trialkyl phosphates, based on phosphorous acid such as phosphite or phosphate derivatives, or a salt of these acids, for example zinc salts; this stabilizer makes it possible to limit the coloration of the polymer during its manufacture. Its use may be advantageous in particular when the polycondensation is performed in the melt. However, their amount is generally less than 0.01% of the total number of moles of monomers (A) and (B).

In the polycarbonate manufacturing process according to the invention, the step of transesterification of the monomers (A) and (B) is performed during step (3). The polymerization type and conditions are not particularly limited.

This reaction may be performed in the melt, i.e. by heating the reaction medium in the absence of solvent. This polymerization may also be performed in the presence of solvent. This reaction is preferably performed in the melt.

This step (3) is performed for a time sufficient to obtain a polycarbonate. Advantageously, the duration of step (3) ranges from 1 hour to 24 hours, for example from 2 to 12 hours. Preferentially, the reactor is heat-regulated during step (3) to a temperature ranging from 100° C. to 250° C. and preferentially from 150 to 235° C.

It is possible to perform all of step (3) at an isotherm. However, it is generally preferred to increase the temperature during this step, either in temperature stages, or by using a temperature ramp. This temperature increase during step (3) makes it possible to improve the polycondensation reaction by transesterification, i.e. to increase the molecular mass of the final polycarbonate obtained, said polycarbonate moreover having a weaker coloration than when all of step (3) of the process is performed at its highest temperature.

Needless to say, it is preferred to perform step (3) under an inert atmosphere, for example under nitrogen. Using the standard processes generating phenol during the polycondensation reaction, it is necessary, in order to be able to remove this phenol, to perform the entire reaction under vacuum. To remove the alcohols generated during the process according to the invention, the vacuum in the reactor is not necessary, since the alcohols generated can be distilled off more easily than phenol. The Applicant has found that the process according to the invention has the advantage that the polycondensation step does not necessarily take place under a high vacuum. Thus, according to one variant of the process of the invention, at least part of step (3) is performed at a pressure ranging from 30 kPa to 110 kPa, advantageously from 50 to 105 kPa and preferentially from 90 to 105 kPa, for example at atmospheric pressure. Preferentially, at least half of the total duration of step (3) is performed at this pressure.

However, step (3) may be entirely or partly performed under a slightly higher vacuum, for example with a pressure inside the reactor of between 100 Pa and 20 kPa. Obviously, this vacuum is adjusted according to the temperature inside the reactor and the degree of polymerization: when the degree of polymerization is low, in the event of an excessively low pressure and an excessively high temperature, the reaction cannot proceed correctly since the monomers are extracted from the reactor by distillation. This step under a slightly higher vacuum may be performed at the end of the reaction, which furthermore makes it possible to remove some of the residual species.

By way of example, the process may be performed by performing the following different successive steps:
 a first step for 2 hours 30 minutes at 170° C. at atmospheric pressure;
 a second step for 1 hour at 200° C. at atmospheric pressure;
 a third step for 1 hour at 220° C. at atmospheric pressure;
 a fourth step for 1 hour at 235° C. at atmospheric pressure;
 a fifth step for 1 hour at 235° C. at a pressure of about 300 Pa.

By means of the process of the invention, it is possible to obtain a mass yield, defined by the ratio of the mass of polycarbonate recovered to the mass of the sum of the monomers used, of greater than or equal to 40%, advantageously greater than 50% and preferably greater than 55%.

The reactor is generally equipped with a means for removing the alcohols generated during the polycondensation reaction, for example a distillation head connected to a condenser.

The reactor is generally equipped with a stirring means such as a stirring system with paddles.

Monomers (A1), (A2) and (B) react randomly during step (3). When a single introduction of monomer (B) is performed, a polycarbonate with a random distribution of the diols (B) in the polymer is thus obtained. However, it is possible to perform one or more additional steps of introduction of monomers (B), after starting the condensation transesterification step (3). In this case, if the monomers (B) introduced are different during the different introductions, a block polymer is then obtained.

The process may be performed in a batch manner, in a continuous manner, or in a semi-continuous semi-batch manner.

The polycarbonate formed during the process in step (4) is recovered. This polycarbonate may be transformed directly in the form of granules with the aid of a granulator, or in any other form. It is possible to perform purification of the polymer thus obtained in a step subsequent to step (4), for example by dissolving the polymer in a solvent such as chloroform and then precipitation by adding a nonsolvent such as methanol.

Another advantage of the process of the invention is that a high mass yield, defined by the ratio of the mass of polycarbonate recovered to the mass of the sum of the monomers used, may be obtained, for example greater than or equal to 40%, advantageously greater than 50% and preferably greater than 55%.

The polycarbonate that may be obtained via the process according to the invention is different from the polycarbonates already known in the previously cited article by Chatti et al. in that it comprises at least one alkyl carbonate end function and at least two successive units:

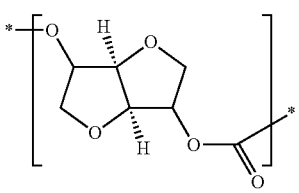

The presence of these end functions and successive units may be determined via analytical techniques such as $^{13}C$ and $^1H$ nuclear magnetic resonance.

Advantageously, the glass transition temperature of the polycarbonate formed is greater than or equal to 25° C., for example ranging from 50 to 180° C. The glass transition temperature of the polycarbonate may be adjusted by varying the synthetic conditions. For example, by selecting a monomers (A)/(B) ratio very close to 1, a polycarbonate is obtained which has a higher glass transition temperature than that of a polycarbonate obtained under the same conditions but with an (A)/(B) ratio quite different from 1. The glass transition temperature also varies very significantly with the nature of the monomer (B). Specifically, if it is desired to obtain a polycarbonate having a substantially high temperature, it is preferred to use, at least partly, cyclic diols rather than linear diols.

The glass transition temperature may be measured by differential calorimetric analysis. For example, a Mettler DSC 30 type machine is used, equipped with aluminum crucibles, calibrated in temperature and heat flux with indium (for example ref. 119441). About 15 mg of the sample are weighed out in a pierced aluminum crucible. The process may be performed in the following manner:

The crucible is placed in the oven under a stream of nitrogen, at a temperature of 25° C.

A rapid cooling ramp is applied from 25° C. to −100° C.

A heating ramp at 10° C./min is applied from −100° C. to 200° C.

A new rapid cooling ramp is applied from 200° C. to −100° C.

A second heating ramp is applied at 10° C./min from −100° C. to 200° C.

The glass transition temperature is given by the temperature of the midpoint, according to the 3-tangent method.

Embodiments will now be detailed in the examples that follow. It is pointed out that these illustrative examples do not in any way limit the scope of the present invention.

EXAMPLES

Preparation of the Monomers

Isosorbide dimethyl carbonate (A1) and isosorbide dimethyl carbonate dimer (A2), which are useful in the polycarbonate manufacturing process according to the invention, are obtained according to the protocols described below.

Synthesis 1

800 g of isosorbide (5.47 mol) and then 19 724 g of dimethyl carbonate (=40 molar equivalents relative to the isosorbide) and 2266 g of potassium carbonate are introduced into a 20 liter reactor, heated via a bath thermostatically maintained with heat-exchange fluid, equipped with a mechanical stirring system with paddles, a system for controlling the temperature of the reaction medium and a rectification column mounted on a reflux head. The reaction mixture is heated for one hour at full reflux, after which time the temperature of the column head vapors reaches 64° C., before commencing the removal of the methanol formed. Heating of the reaction medium is then maintained at a temperature of between 68° C. and 75° C. for 13 hours, after which time the temperature of the column head vapors reaches 90° C. and stabilizes at this temperature (boiling point of dimethyl carbonate). This is the sign that the transesterification reaction is complete and that no more methanol is being formed. The reaction medium is filtered in order to remove the potassium carbonate in suspension therefrom. After distilling off the excess dimethyl carbonate, a white solid is recovered, which contains 94% isosorbide dimethyl carbonate (IDMC) and 6% dimers, these percentages being determined by GC. The solid is free of unreacted isosorbide.

Synthesis 2

Synthesis 1 is repeated, the only difference being that 20 equivalents of dimethyl carbonate are used. The composition of the white solid recovered after distilling off the excess dimethyl carbonate is presented below.

Synthesis 3

Synthesis 1 is repeated, the only difference being that 10 equivalents of dimethyl carbonate are used. The composition of the white solid recovered after distilling off the excess dimethyl carbonate is presented below.

| Ex. | DMC/isosorbide ratio | IDMC | IDMC dimers |
|-----|----------------------|-------|-------------|
| 1   | 40                   | 94%   | 6%          |
| 2   | 20                   | 91.5% | 8.5%        |
| 3   | 10                   | 79%   | 21%         |

Synthesis 4

Part of the product obtained in Synthesis 1 is distilled under high vacuum (<1 mbar) on a scraped-film evaporator in "short-patch" configuration. The evaporator is heated to 140° C. and the product is introduced at 70° C. with a flow rate of 140 g/h. The distillate obtained is a white solid containing 100% by weight of isosorbide dimethyl carbonate, and contains no trace of dimers. The distillation residue is a product comprising 4.5% of residual IDMC and 95.5% of dimers.

Preparation of Polycarbonates

Example 1

Comparative 26.2 g (0.10 mol) of IDMC free of dimers (A1), 14.6 g (0.10 mol) of isosorbide (B) and 0.0069 g (9.99×10$^{-5}$ mol) of 1,2,4-triazole are introduced into a 100 ml reactor, heated via a bath thermostatically maintained with heat-exchange fluid, equipped with a mechanical stirring system with paddles, a system for controlling the temperature of the reaction medium, a nitrogen introduction tube, a distillation head connected to a condenser and to a container for collecting the condensates, and a regulated vacuum system. The installation is placed under a nitrogen atmosphere and the reaction medium is heated by means of the heat-exchange fluid. The temperature is gradually raised in stages of 2 hours 30 minutes at 170° C., 1 hour at 200° C., 1 hour at 220° C. and 1 hour at 235° C. The temperature increase between each stage takes place over 30 minutes. In the course of the reaction, distillation of the methanol is observed. At the end of the 235° C. stage, the installation is placed under vacuum for 1 hour (residual pressure below 300 pascals) while maintaining the temperature at 235° C., so as to continue the reaction, to continue the distillation and to remove the residual low molecular weight species. After cooling the reaction medium, a polymer with a glass transition temperature of 89° C. is obtained.

The operating conditions are collated in table 1 below.

Example 2

According to the Invention

Example 1 is repeated, the only difference being that the IDMC is replaced with a composition (A) consisting of IDMC (A1) and of IDMC dimers (A2) and containing 8.5% by weight of dimers, in proportions such that the ((A1)+(A2))/(B) mole ratio remains equal to 1. A polymer with a glass transition temperature of 130° C. is obtained. The operating conditions are collated in table 1 below.

Example 3

According to the Invention

Example 1 is repeated, the only difference being that the IDMC is replaced with a composition (A) consisting of IDMC (A1) and of IDMC dimers (A2) and containing 21% by weight of dimers, in proportions such that the ((A1)+(A2))/(B) mole ratio remains equal to 1. A polymer with a glass transition temperature of 120° C. is obtained. The operating conditions are collated in table 1 below.

Example 4

According to the Invention

Example 1 is repeated, the only difference being that the IDMC is replaced with a composition (A) consisting of IDMC (A1) and of IDMC dimers (A2) and containing 95.5% by weight of dimers, in proportions such that the ((A1)+(A2))/(B) mole ratio remains equal to 1. A polymer with a glass transition temperature of 108° C. is obtained.

The operating conditions are collated in table 1 below.

TABLE 1

| Examples | % m (A2)/((A1) + (A2)) | (B) | Nature of the catalyst | $T_v$ (° C.) |
| --- | --- | --- | --- | --- |
| 1 | 0% | isosorbide | 1,2,4-triazole | 89° C. |
| 2 | 8.5% | isosorbide | 1,2,4-triazole | 130° C. |
| 3 | 21% | isosorbide | 1,2,4-triazole | 120° C. |
| 4 | 95.5% | isosorbide | 1,2,4-triazole | 108° C. |

Example 5

Comparative 31.9 g (0.122 mol) of IDMC free of dimers (A1), 17.8 g (0.122 mol) of isosorbide and 0.0084 g ($1.22 \times 10^{-4}$ mol) of 1,2,4-triazole are placed in a reactor identical to that of example 1. The installation is placed under a nitrogen atmosphere and the reaction medium is heated by means of the heat-exchange fluid. The temperature is gradually raised in stages of 2 hours at 130° C. and 2 hours at 170° C. The temperature increase between each stage takes place over 30 minutes.

In the course of the reaction, distillation of the methanol is observed. At the end of the 170° C. stage, the temperature is raised to 220° C. over 30 minutes. When this temperature is reached, the installation is placed under vacuum for 2 hours (residual pressure below 300 pascals) while maintaining the temperature at 220° C., so as to continue the distillation and to remove the residual low molecular weight species. After cooling the reaction medium, a polymer with a glass transition temperature of 76° C. is obtained.

The operating conditions are collated in table 2 below.

Example 6

According to the Invention

Example 5 is repeated, the only difference being that the IDMC is replaced with a composition (A) consisting of IDMC (A1) and of IDMC dimers (A2) and containing 6% by weight of dimers, in proportions such that the ((A1)+(A2))/(B) mole ratio remains equal to 1.

A polymer with a glass transition temperature of 103° C. is obtained.

The operating conditions are collated in the table below.

TABLE 2

| Examples | % mass (A2)/((A1) + (A2)) | Nature of (B) | Nature of the catalyst | $T_v$ (° C.) |
| --- | --- | --- | --- | --- |
| 5 | 0% | isosorbide | 1,2,4-triazole | 76° C. |
| 6 | 6% | isosorbide | 1,2,4-triazole | 103° C. |

Example 7

According to the Invention 53.3 g (0.195 mol) of a composition of IDMC and of IDMC dimers, this composition containing 8.5% by weight of dimers, 28.4 g (0.195 mol) of isosorbide, i.e. a mole ratio of 1/1 between the isosorbide dimethyl carbonate and the comonomer, and 0.0038 g ($1.16 \times 10^{-5}$ mol) of cesium carbonate, i.e. 0.006 mol % relative to (A), are placed in a reactor identical to that of example 1. The installation is placed under a nitrogen atmosphere and the reaction medium is heated by means of the heat-exchange fluid. The temperature is gradually raised in stages of 2 hours 30 minutes at 170° C., 1 hour at 200° C., 1 hour at 220° C. and 1 hour at 235° C. The temperature increase between each stage takes place over 30 minutes. In the course of the reaction, distillation of the methanol is observed. At the end of the 235° C. stage, the installation is placed under vacuum for 1 hour (residual pressure below 300 pascals) while maintaining the temperature at 235° C., so as to continue the distillation and to remove the residual low molecular weight species. After cooling the reaction medium, a polymer with a glass transition temperature of 145° C. is obtained.

The operating conditions are collated in table 3 below.

Example 8

According to the Invention

Example 7 is repeated, the only difference being that composition (A) contains 21% by weight of dimers (A2), (A) and (B) being in proportions such that the ((A1)+(A2))/(B) mole ratio remains equal to 1.

A polymer with a glass transition temperature of 136° C. is obtained.

The operating conditions are collated in table 3 below.

Example 9

According to the Invention

Example 7 is repeated, the only difference being that the isosorbide is replaced with 1,4-cyclohexanedimethanol (1,4-CHDM).

A polymer with a glass transition temperature of 68° C. is obtained.

The operating conditions are collated in table 3 below.

Example 10

According to the Invention

Example 7 is repeated, the only difference being that the isosorbide is replaced with ethylene glycol.

A polymer with a glass transition temperature of 32° C. is obtained.

The operating conditions are collated in table 3 below.

Example 11

According to the Invention

Example 7 is repeated, the only difference being that the isosorbide is replaced with a 50/50 molar mixture of isosorbide/ethylene glycol (EG).

A polymer with a glass transition temperature of 77° C. is obtained.

The operating conditions are collated in table 3 below.

Example 12

According to the Invention

Example 7 is repeated, the only difference being that the (A)/(B) mole ratio is 0.8/1.

A polymer with a glass transition temperature of 125° C. is obtained.

The operating conditions are collated in table 3 below.

Example 13

According to the Invention

Example 7 is repeated, the only difference being that the (A)/(B) mole ratio is 1.25/1.

A polymer with a glass transition temperature of 140° C. is obtained.

The operating conditions are collated in table 3 below.

Example 14

According to the Invention

Example 13 is repeated, the only difference being that the molar percentage of catalyst is 0.002%.

A polymer with a glass transition temperature of 127° C. is obtained.

The operating conditions are collated in the table below.

TABLE 3

| Example | % m (A2)/ ((A1) + (A2)) | Nature of (B) | (A)/(B) mole ratio | Catalyst/(A) mol % | $T_v$ (° C.) |
|---|---|---|---|---|---|
| 7 | 8.5% | isosorbide | 1 | 0.006% | 145 |
| 8 | 21% | isosorbide | 1 | 0.006% | 136 |
| 9 | 8.5% | 1,4 CHDM | 1 | 0.006% | 68 |
| 10 | 8.5% | EG | 1 | 0.006% | 32 |
| 11 | 8.5% | Isosorbide (50)/EG (50) (mol/mol) | 1 | 0.006% | 77 |
| 12 | 8.5% | isosorbide | 0.8 | 0.006% | 125 |
| 13 | 8.5% | isosorbide | 1.25 | 0.006% | 140 |
| 14 | 8.5% | isosorbide | 1.25 | 0.002% | 127 |

The invention claimed is:

1. A process for manufacturing a polycarbonate, characterized in that it comprises:
   a step (1) of introducing, into a reactor, a composition (A) comprising at least one dianhydrohexitol carbonate bearing two alkyl carbonate functions, said composition (A) comprising, relative to the sum of (A1) plus (A2):
   from 0 to 99.9% by weight and preferentially from 70% to 99.9% by weight of monomers (A1) of formula:

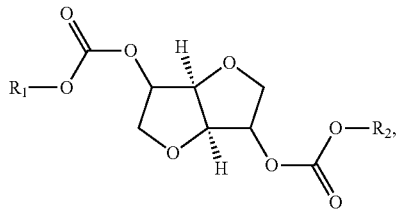

and from 0.1% to 100% by weight and preferentially from 0.1% to 30% by weight of monomers (A2) of formula:

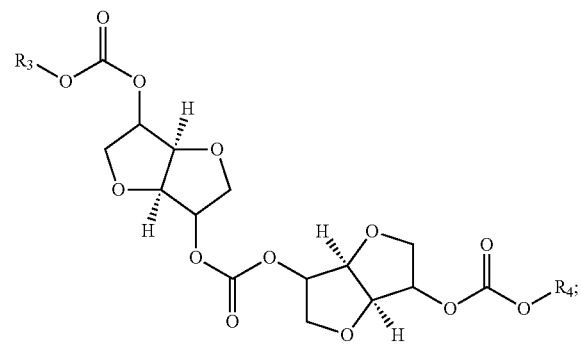

and R1, R2, R3 and R4 being identical or different alkyl groups;
   a step (2) of introducing a diol or a mixture of diols (B);
   a subsequent step (3) of polycondensation by transesterification of the monomer mixture comprising (A2), (B) and optionally (A1);
   a step (4) of recovering the polycarbonate formed in step (3).

2. The process as claimed in claim 1, wherein the alkyl groups R1, R2, R3 and R4 borne by (A1) and (A2) comprise from 1 to 10 carbon atoms, advantageously from 1 to 6, for example from 1 to 4, and are most particularly chosen from methyl and ethyl groups.

3. The process as claimed in claim 1, wherein the dianhydrohexitol carbonates of composition (A) are isosorbide carbonates.

4. The process as claimed claim 1, wherein composition (A) introduced during step (1) comprises, relative to the total weight of monomers (A1) and (A2):
- from 75% to 99%, advantageously from 80% to 97%, for example from 85% to 95%, of (A1); and
- from 1% to 25%, advantageously from 3% to 20%, for example from 5% to 15%, of (A2).

5. The process as claimed in claim 1, wherein monomer (B) comprises at least 1 mol % of cyclic diol, preferably at least 20 mol %, advantageously at least 50 mol % and preferentially at least 80 mol %, and most preferentially consists of cyclic diol or of a mixture of cyclic diols.

6. The process as claimed in claim 5, wherein the cyclic diol included in (B) is nonaromatic.

7. The process as claimed in claim 5, wherein the cyclic diol included in (B) comprises 5- or 6-membered rings, preferentially chosen from isosorbide, isomannide, isoidide, 1,2-cyclohexanedimethanol, 1,3-cyclohexanedimethanol and 1,4-cyclohexanedimethanol.

8. The process as claimed in claim 1, wherein the mole ratio of (A1)+(A2)/(B) ranges from 0.7 to 1.3 and preferentially from 0.9 to 1.1.

9. The process as claimed in claim 1, wherein the sum of (A1), (A2) and (B) constitutes more than 90 mol % of the total amount of monomers introduced into the reactor.

10. The process as claimed in claim 1, wherein composition (A) comprises more than 75 mol % and preferably more than 90 mol % of monomers (A1) and (A2).

11. The process as claimed in claim 1, wherein the reactor is adjusted to a temperature ranging from 100° C. to 250° C. during step (3), preferentially from 150 to 235° C.

12. The process as claimed in claim 1, characterized in that step (3) takes place in the presence of a transesterification catalyst, advantageously a catalyst comprising at least one alkali metal or alkaline-earth metal ion, a quaternary ammonium ion, a quaternary phosphonium ion, a cyclic nitrogen compound, a basic boron-based compound or a basic phosphorus-based compound, advantageously chosen from cesium carbonate, triazoles and tetramethylammonium hydroxide.

13. The process as claimed in claim 1, wherein the amount of the catalyst ranges from $10^{-7}$ mol % to 1 mol %, preferentially from $10^{-4}$ mol % to 0.5 mol %, relative to the sum of (A1) and (A2).

14. The process as claimed in claim 1, wherein at least part of step (3) is performed at a pressure ranging from 30 kPa to 110 kPa and advantageously from 90 to 105 kPa, for example at atmospheric pressure.

15. The process as claimed in claim 1, wherein the polycarbonate recovered in step (4) has a glass transition temperature of greater than or equal to 25° C., preferably greater than or equal to 50° C. and advantageously from 100 to 180° C., for example from 120 to 170° C.

* * * * *